United States Patent [19]

Wallace et al.

[11] Patent Number: 4,477,096
[45] Date of Patent: Oct. 16, 1984

[54] SOCKET RETAINER

[75] Inventors: William K. Wallace, Barneveld; David A. Giardino, Deerfield, both of N.Y.

[73] Assignee: Chicago Pneumatic Tool Company, New York, N.Y.

[21] Appl. No.: 404,556

[22] Filed: Aug. 2, 1982

[51] Int. Cl.³ .............................................. B23G 3/26
[52] U.S. Cl. ..................................... 279/97; 279/1 C; 279/1 Q; 279/86; 403/108; 403/318
[58] Field of Search ................. 279/1 Q, 1 C, 97, 86, 279/1 ME; 403/108, 317, 318, 324, 379; 81/177 G; 464/87, 112, 182

[56] References Cited

U.S. PATENT DOCUMENTS

| | | | |
|---|---|---|---|
| 1,635,929 | 7/1927 | Dean | 464/182 |
| 2,304,038 | 12/1942 | Thompson | 81/177 G |
| 2,326,317 | 8/1943 | Amtsberg | 403/318 |
| 2,881,884 | 4/1959 | Amtsberg | 173/93.6 |
| 3,549,160 | 12/1970 | Etzkorn | 279/97 |
| 3,832,916 | 9/1974 | Schoeps | 81/464 |
| 4,304,500 | 12/1981 | Faulk | 403/379 X |

FOREIGN PATENT DOCUMENTS

| | | | |
|---|---|---|---|
| 1159912 | 7/1969 | United Kingdom | 464/182 |
| 679736 | 8/1979 | U.S.S.R. | 403/324 |

Primary Examiner—William R. Briggs
Assistant Examiner—Lawrence H. Meier
Attorney, Agent, or Firm—Stephen J. Rudy

[57] ABSTRACT

An elastic ring for maintaining a pin in a hole formed in a socket and work drive shaft of a rotary tool. The ring has integral fingers which project into the ends of the hole so that the pin cannot dislodge the ring by centrifugal force when the tool is operating at high speed. Several variations of the ring include weighted areas at portions of the ring midway between the fingers, which areas counterbalance centrifugal force on the ring to supplement holding force of the fingers upon the pin.

4 Claims, 10 Drawing Figures

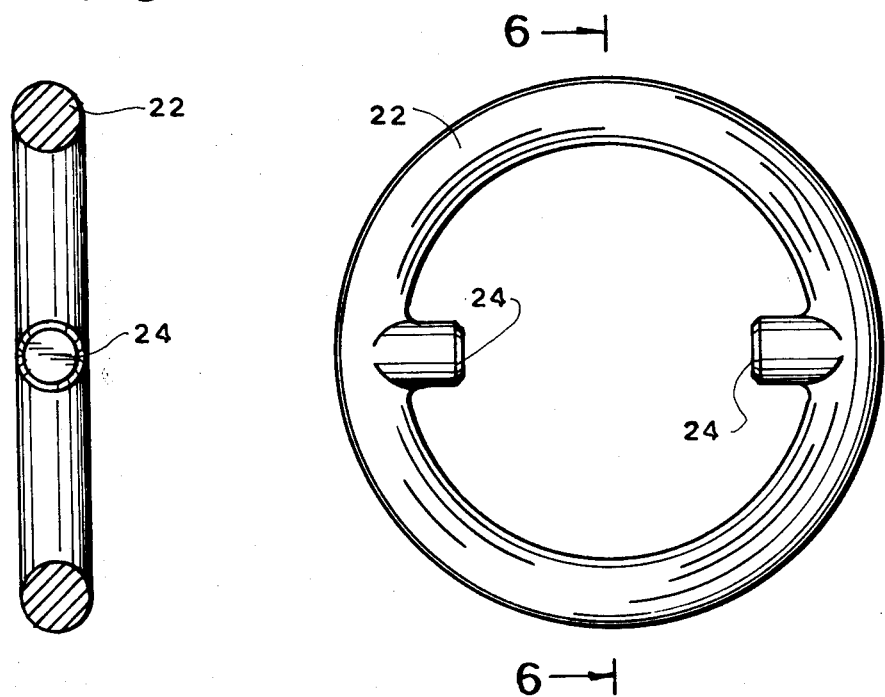
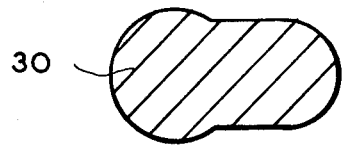

SOCKET RETAINER

BACKGROUND OF THE INVENTION

This invention relates to a retainer for maintaining a socket upon a tool shank of a high speed rotary tool.

While many different designs have been proposed and utilized in the art under consideration, the present invention is concerned with the type using an elastic band positioned upon the tool socket for maintaining a holding pin in a hole formed in the socket and tool shank. Such an arrangement is disclosed, for example, in U.S. Pat. No. 2,881,884, issued on Apr. 14, 1959 to Lester A. Amtsberg. While the elastic band used in the Amtsberg patent is flat in cross-section, bands of circular cross section are known, i.e., "O" ring configuration. Such bands are generally positioned in a circumferential groove formed on the tool socket which groove coincides with the ends of the pin hole.

The problem with such elastic band arrangements is that at high speed, when the tool is running free, i.e., not driving a work piece, centrifugal force acting upon an uncentered holding pin can cause the pin to force or cam the elastic ring aside so that the pin is suddenly ejected from the hole and become a dangerous projectile.

The socket retainer of the present invention avoids the aforesaid problem of the prior art elastic band arrangements by utilizing a unique elastic band which cannot be dislodged by the socket holding pin when the tool is running at high speed.

The main object of this invention is to provide a socket retainer utilizing a unique elastic ring which cannot be dislodged from position upon the tool socket by the socket holding pin at high speed tool operation.

Another object is to provide a socket retainer which is of simple structure and which can be applied to a socket using an "O" type elastic retaining ring without additional changes in socket structure being required.

These and further objects and features of the invention will become apparent from the following disclosure including a drawing wherein:

FIG. 5 is a plan view of the socket retainer shown in FIGS. 3 and 4;

FIG. 6 is a cross section view as seen from line 6—6 in FIG. 5;

FIG. 8 is a cross section view as seen from line 8—8 in FIG. 7;

Figure 1:
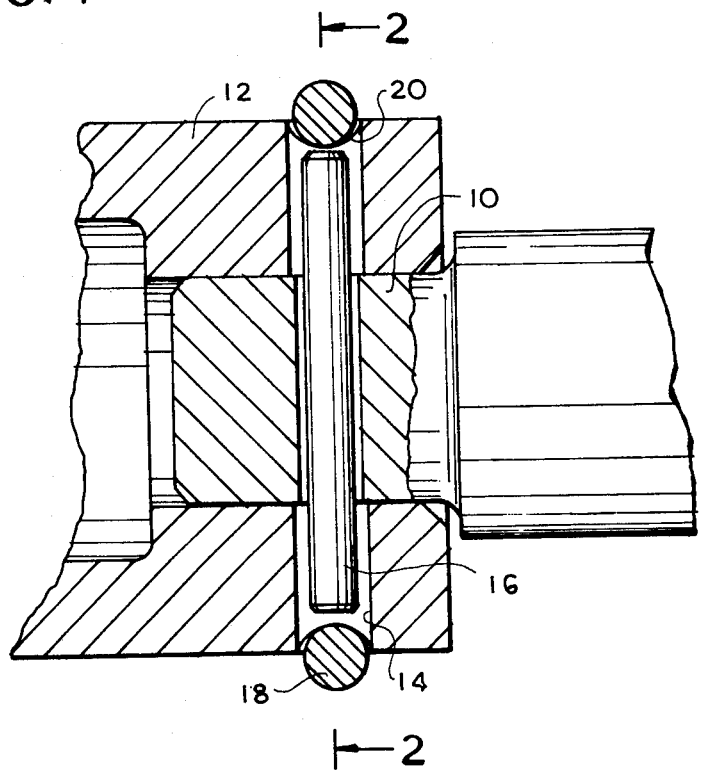
FIG. 1 is a cross section view of a socket positioned upon the shank of a pneumatically powered and tool showing a socket retainer as found in prior art arrangements.
Figure 2:
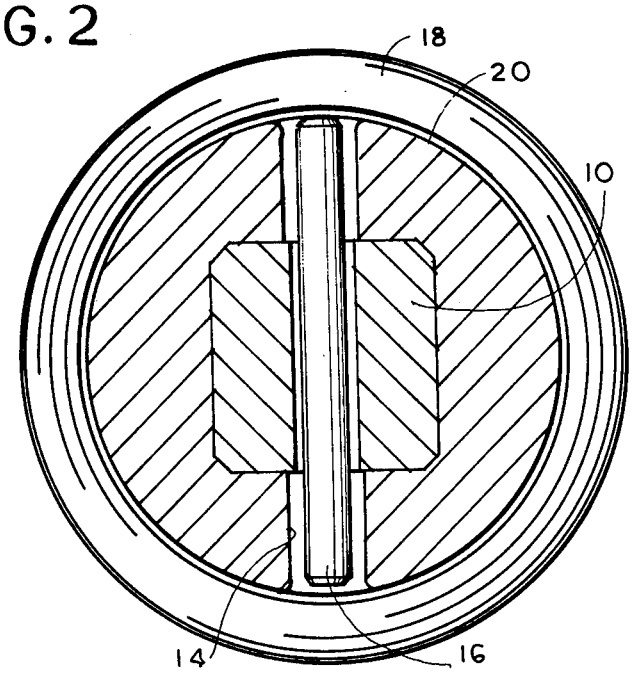
FIG. 2 is a section view as seen from line 2—2 in FIG. 1.

Referring now to FIGS. 1 and 2, numeral 10 identifies the work drive shaft of a high speed pneumatically driven hand-held tool (not shown), and 12 is a socket member positioned thereupon. A hole 14 is arranged to extend through the drive shaft and socket for receipt of a holding pin 16. A toroidal element in the form of an "O" type elastic ring 18, is positioned in a circumferential groove 20 formed on the surface of the socket member, whereby the pin 16 is enclosed in the hole 14. Such an arrangement illustrates a socket retainer well known in the prior art.

When the drive shaft is rotated at high speed, such as happens when the tool is running free, an uncentered holding pin can be driven against the ring 18 and force or cam it aside allowing the pin to be ejected from the hole and become a projectile. Such a happening may result in injury to personnel or serious property damage.

Figure 3:
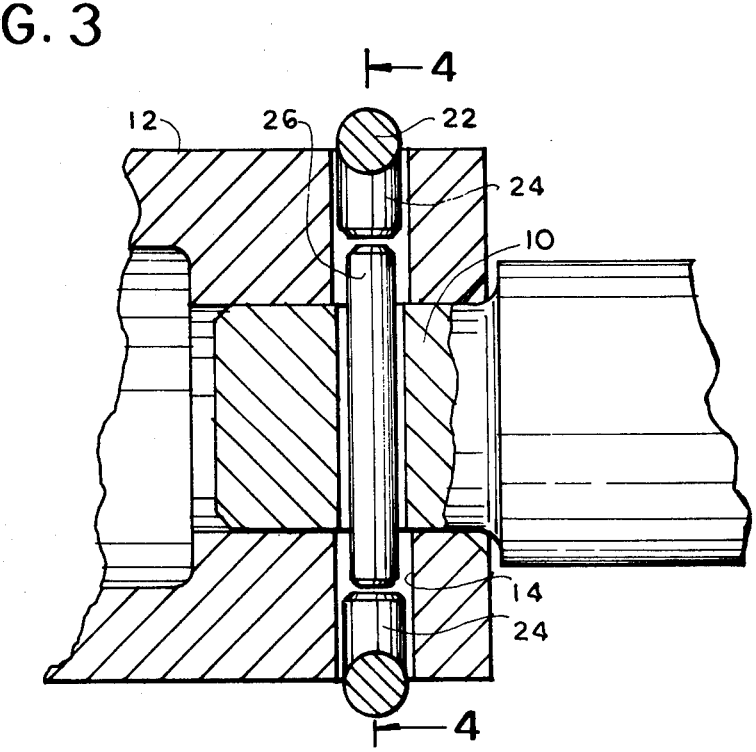
FIG. 3 is a cross section view of a socket positioned upon the shank of a pneumatically powered tool and showing a socket retainer representing an embodiment of the invention.
Figure 4:
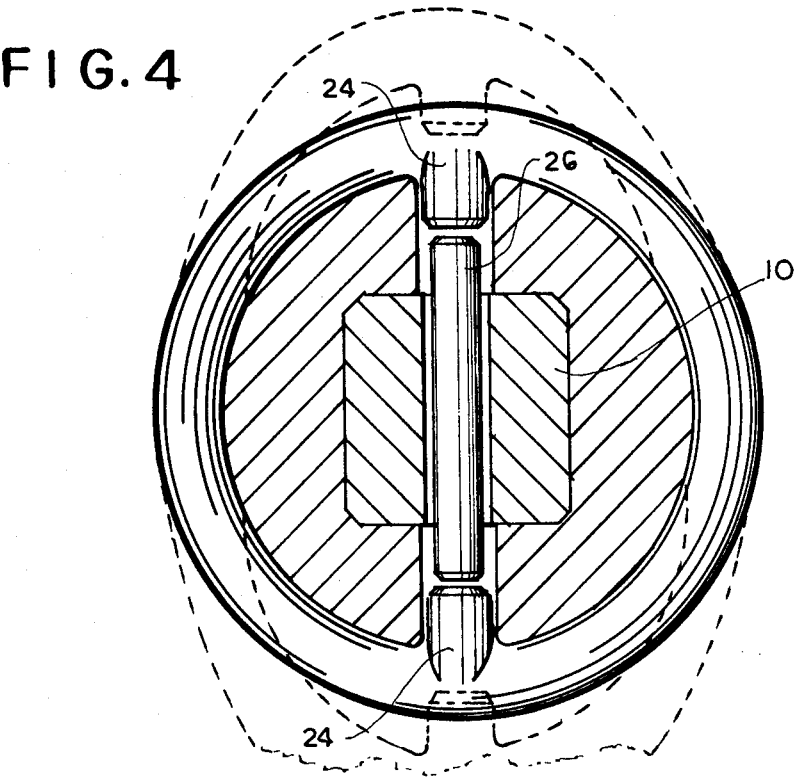
FIG. 4 is a section view as seen from line 4—4 in FIG. 3.

The subject invention, as seen as FIGS. 3 and 4, utilizes an "O" type elastic ring 22 which has a pair of diametrically arranged inwardly integral fingers 24, which are of slightly less diameter than the hole 14. A holding pin 26, of less length than the holding pin 16 of the FIGS. 1 and 2 retainer arrangement, is maintained in the hole 14 by reason of the fingers 24. The dotted line representation of the ring 22, illustrates the shape the ring 22 may have at high speed tool operation, from which it will be apparent that the pin 26 cannot be ejected from the hole 14.

The design of the ring 22 to be functionally effective, must assure that pretension of the ring, under static conditions, must exceed the centrifugal force generated at maximum R.P.M. of the tool. Ring pretension can be calculated as follows:

$$\text{Ring pretension} > 0.0000283 \, WRV^2$$

wherein
- W = Weight of the heaviest section of the ring (i.e. region of fingers 24)
- R = Effective Radius (distance from center of rotation/center of gravity of section)
- V = Max R.P.M.

The foregoing formula can be found in "Machinery Handbook", 20th Edition, International Press, 1975.

While many different elastic materials may be used, Nitrile Buna IV has been used with success.

Figure 7:
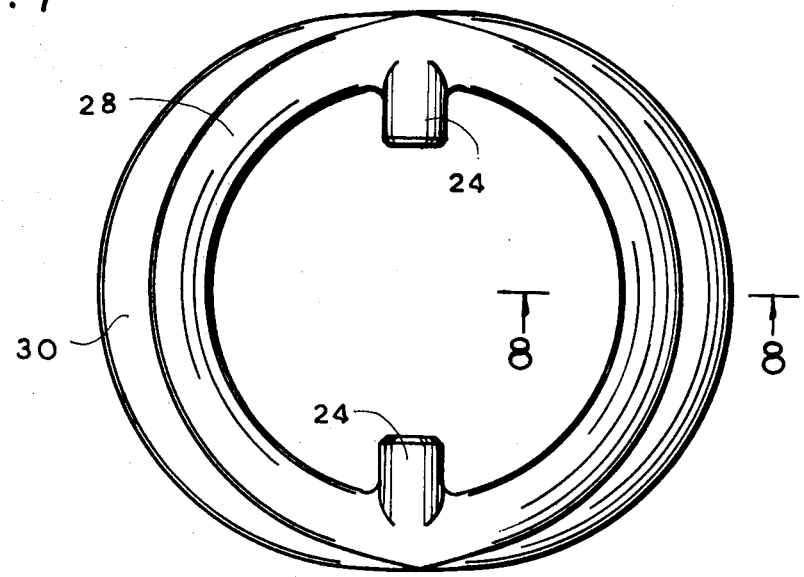
FIG. 7 is a plan view of a socket retainer illustrating another embodiment of the invention.
Figure 9:
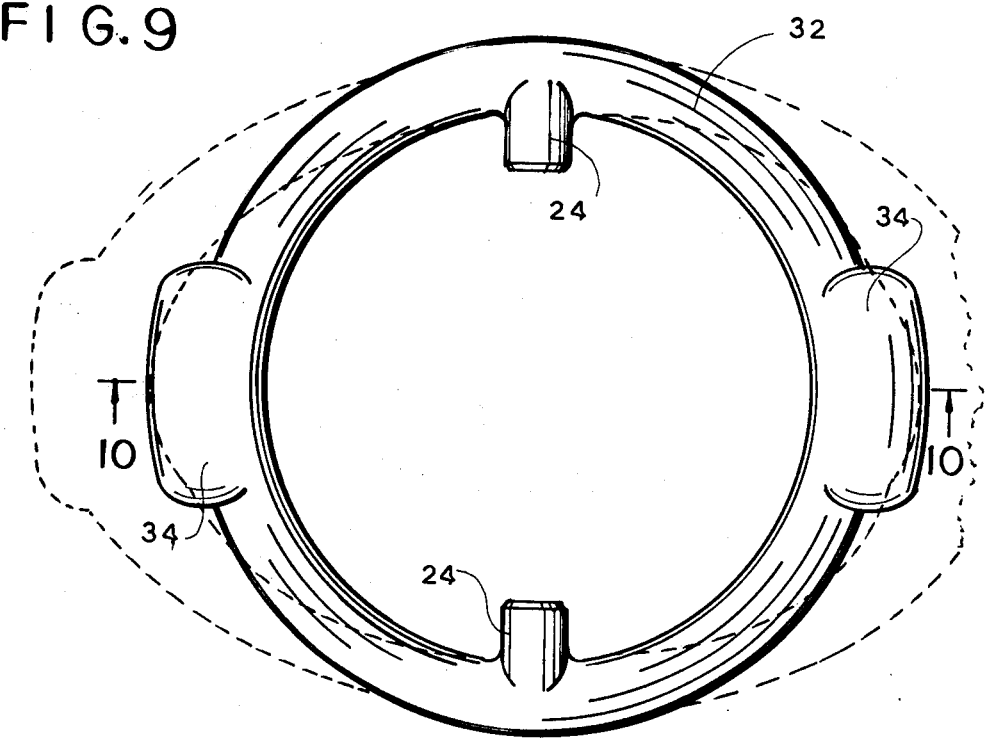
FIG. 9 is a plan view of a socket retainer illustrating another embodiment of the invention.
Figure 10:
FIG. 10 is a section view as seen from line 10—10 in FIG. 9.

The "O" ring 28, illustrated in FIG. 7, is alike in structure to "O" ring 22, however, the regions 30, midway between the fingers 24, are of somewhat greater in cross section area than the remaining diametrical portions of the ring, because of progressively increasing radii as seen in FIG. 7. The increased cross section area 30 adds weight to counterbalance the weight of the fingers 24, so that centrifugal force will tend to expand the ring into an oval shape at high speed, with the minor diameter of the oval being in the region of the fingers. Such will assure that the fingers 24 will not be forced out of hole 14. Another form of a mid-weighted ring is illustrated in FIGS. 9 and 10, wherein the ring 32 has apposed weighted regions 34, which are not tapered, but are relatively short and concentrated. The ring 32 will provide operating characteristics similar to that of the ring 30. An expanded position of the ring 32 at high speed tool operation is illustrated in dotted lines in FIG. 9.

It is to be noted that the fingers 24 of the ring will support the ring in position on the socket even if a groove 20 is not used on the socket. Such an arrangement would provide a reduction in fabrication cost of the socket. Furthermore, while the cross-section of rings 18, 22 and 32 is circular, other cross-section configurations i.e., oval, rectangular, etc. may be employed.

The retension value for rings 30 and 32, can be calculated from the following equation:

| Centrifugal force of the retaining lug portion of ring. | Centrifugal force of the added section @ 90° to the retaining lugs. |
|---|---|
| $0.0000283\ WRV^2$ | or |
|  | $0.0000283\ W^1 R^1 V^2$ |
| W = Weight of lug portion | $W^1$ = Weight of added section |
| R = Effective radius of lug portion | $R^1$ = Effective radius of added section |
| V = Max R.P.M. | V = Max R.P.M. |

From the foregoing it will be seen that the embodiments of the invention disclosed above will satisfy the objectives set forth hereinbefore.

While the invention has been disclosed in preferred embodiments illustrated and explained herein, it is possible that variations in design may be made without departing from the spirit of the invention, hence, the inventors reserve the right to all variations encompassed by the claims which follow.

What is claimed is:

1. An elastic ring of a substantially homogenous material for use in maintaining a pin in a hole formed in a socket and a work drive shaft of a rotary tool which ring is toroidal in shape and is formed with diametrically disposed integral fingers projecting inwardly from the inner surface of the ring, said fingers being arranged to enter the ends of said hole and wherein the regions circumferentially spaced 90° from the fingers are of greater cross sectional area than any other cross sectional areas of the ring so that upon rotation of the rotary tool said fingers are driven radially inwardly.

2. An elastic ring in accordance with claim 1, wherein the diameter of the fingers is substantially the same as the cross sectional diameter of the ring.

3. An elastic ring in accordance with claim 1, wherein said regions are formed by progressively increasing radii which are at a maximum at 90° from the fingers.

4. An elastic ring in accordance with claim 1, wherein said regions are relatively short and are concentrated about a point 90° from the fingers.

* * * * *